No. 608,449. Patented Aug. 2, 1898.
E. V. GAUTHIER.
SCREW MACHINE CHUCK.
(Application filed Aug. 14, 1897.)

(No Model.)

Witnesses.
W. J. Baldwin
E. M. Healy

Inventor.
E. V. Gauthier
By
Southgate & Southgate
Attorneys.

THE NORRIS PETERS CO., PHOTO-LITHO., WASHINGTON, D. C.

UNITED STATES PATENT OFFICE.

ERNEST V. GAUTHIER, OF WESTBOROUGH, MASSACHUSETTS.

SCREW-MACHINE CHUCK.

SPECIFICATION forming part of Letters Patent No. 608,449, dated August 2, 1898.

Application filed August 14, 1897. Serial No. 648,228. (No model.)

*To all whom it may concern:*

Be it known that I, ERNEST V. GAUTHIER, a citizen of the United States, residing at Westborough, in the county of Worcester and State of Massachusetts, have invented a new and useful Improvement in Screw-Machine Chucks, of which the following is a specification.

The object of my present invention is to provide a chuck for screw-machines which can be operated to clamp pieces which may vary somewhat in diameter in accurate axial or longitudinal adjustment with respect to the machine without stopping its rotation.

To these ends my invention consists of the parts and combinations of parts, as hereinafter described, and more particularly pointed out in the claims at the end of this specification.

Figure 1:
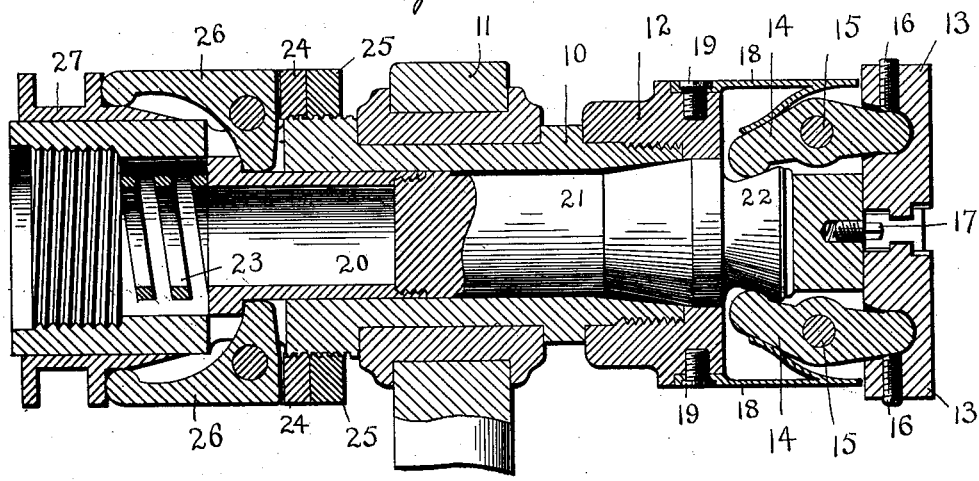
Figure 2:
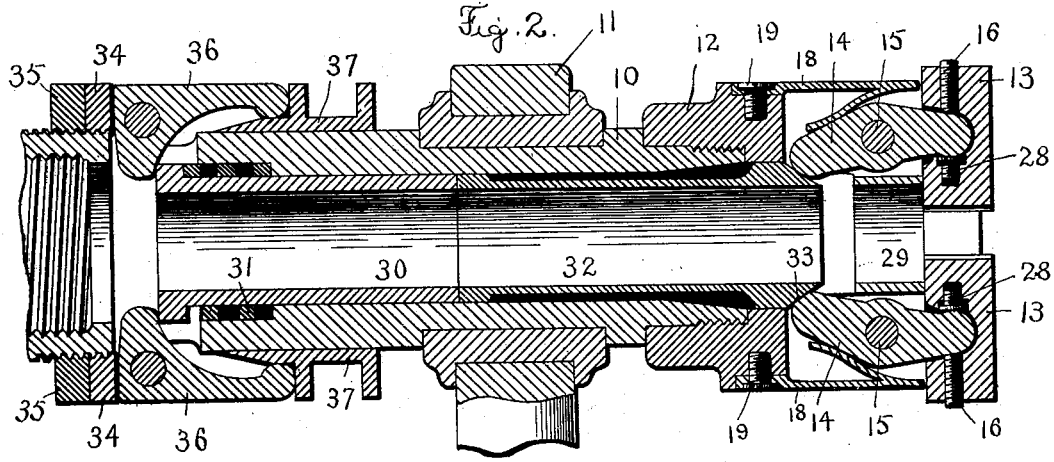
Figure 3:
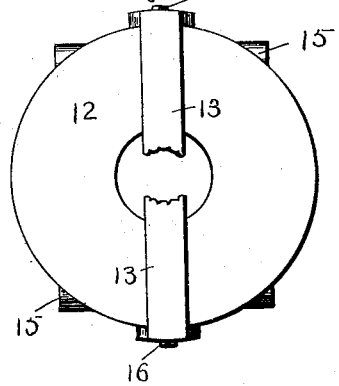

In the accompanying drawings, Figure 1 is a sectional view of a chuck for screw-machines constructed according to my invention. Fig. 2 is a similar view illustrating a slightly-modified form of construction, and Fig. 3 is an end view of my chuck for screw-machines.

Two kinds of chucks have heretofore ordinarily been used in connection with screw-machines—first, movable-jawed chucks, which can only be clamped by means of a key or wrench, the use of which requires the stoppage of the machine, and, second, the so-called "automatic" chucks, which can be adjusted while the machines in connection with which they are employed are in operation.

The so-called "automatic" chucks have heretofore comprised split-end spring-collets or chuck-sections for engaging the work. These spring-collets have been provided at their ends with operating cam-shoulders, so that when pushed in or drawn back, as the case might be, their split or quartered sections will be contracted so as to be clamped into engagement with the work to be operated upon. This form of automatic chuck can be used to advantage when the stock or blank employed in the machine is of an exactly uniform diameter or when a slight variation in length of the articles being made is immaterial. Whenever there is a variation in the diameter of the stock or blanks being operated upon, the use of the common form of split-collet automatic chuck will produce corresponding variations in the axial or longitudinal adjustment of the work to be operated upon. For example, when the ordinary draw-in automatic chuck is employed pieces of smaller diameter will be drawn farther back into the spindle of the screw-machine before being clamped and held rigidly than would pieces of somewhat larger diameter. Hence a chuck of this kind cannot be used to advantage when it is essential to produce pieces having exactly uniform lengths.

The especial object of my present invention is therefore to construct a so-called "automatic" chuck so that it will secure the accurate axial or longitudinal adjustment with respect to the machine of the pieces operated upon independent of slight variations in the diameter of such pieces.

A chuck for screw-machines constructed according to my invention comprises a plurality of radially-movable jaws which always maintain the same position longitudinally with respect to the machine and means for clamping said jaws without stopping the rotation of the chuck.

Referring to the drawings and in detail, 10 designates a spindle extension journaled in a support 11, substantially as described in my Patent No. 594,077, granted to me November 23, 1897. Threaded onto the spindle extension 10 is a body portion 12. Mounted on the body portion 12 are radially-movable jaws 13.

In the drawings I have shown a chuck employing only two radially-movable jaws 13. The number of said movable jaws is, however, immaterial, and three or four movable jaws closing to a common center can be employed, if desired.

The clamping mechanism which I employ for actuating the radially-movable jaws 13 comprises small levers 14, pivotally mounted on pins 15 in the body portion 12. The levers 14 enter into sockets in the jaws 13, and the wear or lost motion between these parts can be taken up by screws 16. Engaging the levers 14 are springs 18, which are secured in place by screws 19 and normally tend to spread apart or open the radially-movable jaws 13. Splined into the spindle extension 12 and movable longitudinally therein is a sleeve 20, threaded into which is an operating-piece 21, having a conical or cam section 22, engaging the small levers 14. The sleeve 20 is normally forced outwardly by means of a coiled spring 23. Threaded onto the spindle extension 10 is a piece 24, pivotally mounted in which are small bell-crank levers 26 for drawing the sleeve 20 back against the tension of its spring 23. The piece 24 can be clamped in its adjusted position on the spindle extension 10 by means of a check-nut 25. Movably mounted on the spindle extension 10 is a collar 27, which is grooved to engage pins carried by an ordinary shifting handle or yoke and is provided with a conical or cam section for actuating the bell-crank levers 26. By means of this construction it will be seen that I have provided a chuck for screw-machines which can be clamped while the machine is in operation and as the radially-movable jaws are fixed longitudinally with respect to the machine I have provided a construction which will secure an absolutely uniform longitudinal adjustment of the pieces to be operated upon independent of slight variations in the diameter thereof.

When the body portion 12 is left solid, as illustrated in Fig. 1, the same may be provided with a set-screw 17, which forms a stop to regulate the distance that work can be inserted into the chuck, and, if desired, the jaws 13 may be provided with a plurality of steps for engaging different sizes of work.

In some cases the body portion of the chuck and the operating-piece may be bored out or made hollow, so that a chuck constructed according to my invention may be used to act upon stock inserted through the hollow spindle of the machine in the ordinary manner, and, if desired, the operating devices for my chuck can be arranged to constitute what is known as a "push-out" chuck, and I have illustrated such a construction in Fig. 2. As shown in this figure, the body portion 12 is bored out or made hollow, as at 29, so that work can be fed to the rear side of the chuck through the hollow spindle of the machine. In this figure I have also illustrated each of the radially-movable jaws 13 as provided with two adjusting-screws 16 and 28, arranged so that said screws may be adjusted to true up the jaws and keep their clamping-faces concentric with the spindle extension 10.

Mounted in the spindle extension 10 is a sleeve 30, which is normally forced back by a coiled spring 31. Abutting against the end of the sleeve 30 is a hollow operating-piece 32, having a conical operating or cam section 33 for engaging the levers 14.

Threaded onto the spindle extension 10 is a piece 34, which can be clamped in its adjusted position by a check-nut 35. Pivoted in the piece 34 are small bell-crank levers 36, which can be operated by means of the collar 37 to push the sleeve 30 outwardly, so as to force the operating-piece 32 outwardly and clamp the radially-movable jaws 13 into engagement with the work.

While I have illustrated the movable sleeve and operating-piece which I employ for actuating the movable jaws of my chuck mounted in a spindle extension which is designed for and constructed to be threaded onto the ordinary screw-machine spindle, it is obvious that these pieces can be mounted inside of the main spindle proper, and in the present application I do not base any of my claims on the use of a spindle extension arranged to permit me to employ the full inside diameter of the main spindle of a screw-machine, as such construction is more particularly claimed in my Patent No. 594,077, granted to me November 23, 1897, before referred to.

I am aware that changes may be made in the construction of screw-machine chucks by those who are skilled in the art without departing from the scope of my invention as expressed in the claims. I do not wish, therefore, to be limited to the forms which I have shown and described; but What I do claim, and desire to secure by Letters Patent of the United States, is—

1. In a chuck for screw-machines, the combination of a hollow spindle or extension, jaws movable radially with respect to said spindle, an operating sleeve or piece for clamping the jaws into engagement with the work mounted inside of the spindle, and means for shifting said sleeve without stopping the operation of the machine, substantially as described.

2. In a chuck for screw-machines, the combination of a hollow spindle or extension, radially-movable jaws, springs for normally opening the jaws, clamping devices comprising levers engaging said jaws, an actuating sleeve or piece movably mounted inside of the spindle and having a cam-section engaging said levers, and means for shifting the actuating-sleeve without stopping the operation of the machine in connection with which the chuck is employed, substantially as described.

3. In a chuck for screw-machines, the combination of a body portion 12, jaws 13 movable radially therein, levers 14 pivotally mounted on pins 15 and engaging with jaws 13, springs 18 engaging said levers to normally open the jaws, an operating-piece having a cam-section engaging the levers 14, a longitudinally-movable sleeve engaging the actuating-piece, a spring tending to move the sleeve in one direction, pivoted bell-crank levers engaging said sleeve, and means for actuating the bell-crank levers to move the sleeve against the tension of its spring without stopping the operation of the machine in connection with which the chuck is used, substantially as described.

In testimony whereof I have hereunto set my hand in the presence of two subscribing witnesses.

ERNEST V. GAUTHIER.

Witnesses:
 PHILIP W. SOUTHGATE,
 HENRY EVELETH HILL.